July 25, 1972
G. PREUSSER ET AL
3,679,579
PROCESS FOR RECOVERING HIGHLY PURE AROMATIC SUBSTANCES
FROM HYDROCARBON MIXTURES CONTAINING BOTH AROMATIC AND
NON-AROMATIC SUBSTANCES
Filed March 22, 1971
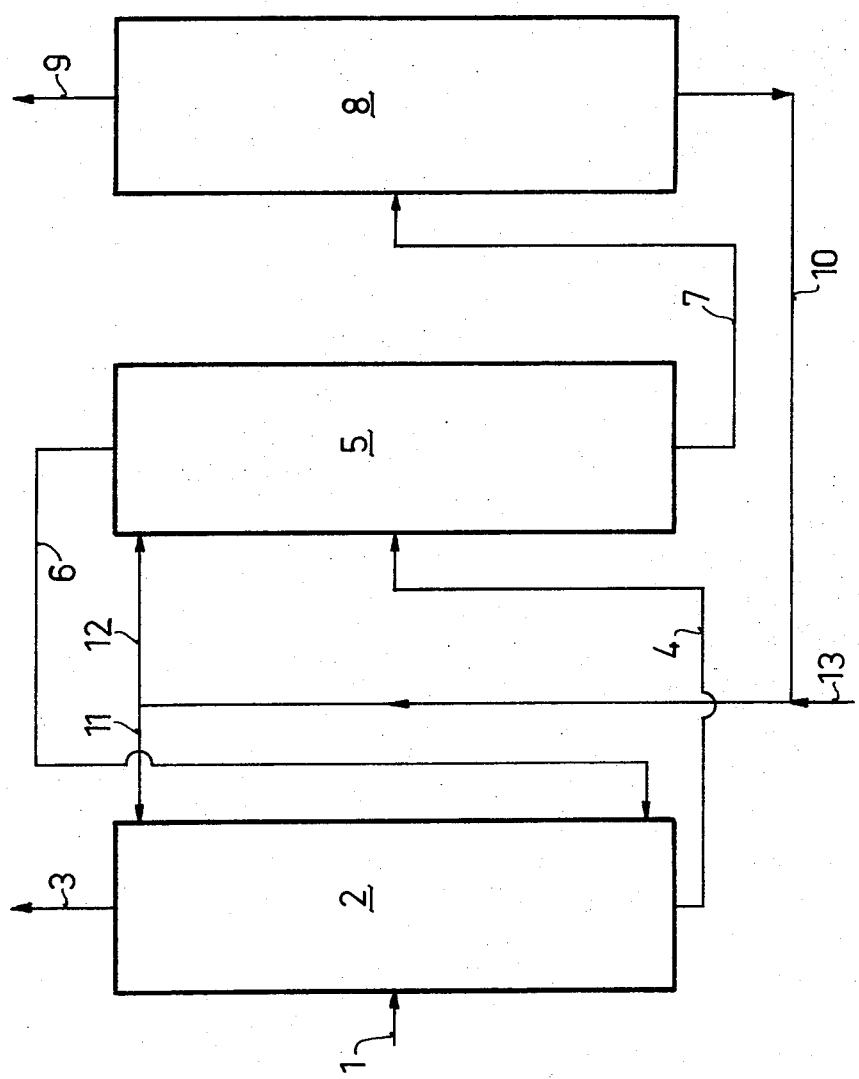
INVENTORS:
GERHARD PREUSSER
MARTIN SCHULZE
KLAUS RICHTER

United States Patent Office 3,679,579
Patented July 25, 1972

---

3,679,579
PROCESS FOR RECOVERING HIGHLY PURE AROMATIC SUBSTANCES FROM HYDROCARBON MIXTURES CONTAINING BOTH AROMATIC AND NON-AROMATIC SUBSTANCES
Gerhard Preusser, Essen, Martin Schulze, Neviges, and Klaus Richter, Essen, Germany, assignors to Heinrich Koppers Gesellschaft mit beschrankter Haftung, Essen, Germany
Filed Mar. 22, 1971, Ser. No. 126,650
Claims priority, application Germany, Mar. 20, 1970, P 20 13 298.3
Int. Cl. C10g 21/20
U.S. Cl. 208—323    12 Claims

ABSTRACT OF THE DISCLOSURE

Process for recovering highly pure aromatic substances from hydrocarbon mixtures which contain in addition to the aromatic substances varying amounts of non-aromatic substances by liquid-liquid extraction advantageously in combination with an after arranged extractive distillation characterized in that there is used as selective solvent a mixture of N-substituted morpholine and N-substituted succinimide in a mixing range of between 90 wt.-percent N-substituted morpholine and 10 wt.-percent N-substituted succinimide and 30 wt.-percent N-substituted morpholine and 70 wt.-percent N-substituted succinimide.

---

This invention relates to a process for recovering highly pure aromatic substances from hydrocarbon mixtures which contain in addition to the aromatic substances varying but high amounts of non-aromatic substances by liquid-liquid extraction, preferably followed by an extractive distillation.

In recent times, the separation of aromatic substances from hydrocarbon mixtures containing the same has more and more frequently been carried out by extractive distillation. This type of procedure has, in contrast to the previously practiced procedures based on liquid-liquid extraction, a number of advantages. As examples of such advantages the following may be mentioned: simplification of the plant required for recovery of the selective solvent from the raffinate and the almost complete omission of mechanical devices including a large number of circulating pumps and like parts for moving liquids. In addition, there is the advantage that in the extractive distillation, because of the high temperatures involved, the viscosity of the selective solvents used is markedly lowered, whereby the material exchange between the solvent and the substance to be extracted is essentially improved. There is thereby realized an improved loadability so that there can be accomplished the same outputs but with smaller amounts of extractive agent and a smaller plant. In practice, extractive distillation is also preferred as, even though the highest possible yields are obtained therewith, the purity of tthe recovered aromatic substances is also of the highest possible degree. In view of the requirements of the chemical industry for increased purity of the recovered aromatic substances, in the prior practiced procedures it was necessary to subject the aromatic substances to aftertreatments in order to obtain the required degree of purity.

The method of carrying out the extractive distillation requires that the non-aromatic fraction present in the starting hydrocarbon mixture must be distilled off at the head of the extractive distillation column. Unfortunately, this has the result that the economy of such procedure is highly dependent on the composition of the starting hydrocarbon mixture. The higher the proportion of the non-aromatic substances present in the starting hydrocarbon mixture, the more heat energy is required for driving off this fraction from the extractive distillation column. Thus the extractive distillation procedure is superior economically to the liquid-liquid extraction procedure only when the non-aromatic substances are present in the starting hydrocarbon mixture in an amount not exceeding about 50 wt.-percent. On the other hand, regardless of the distribution of aromatics and non-aromatics in the starting material, the liquid-liquid extraction does not provide the high degree of purity of the recovered aromatics obtained in the extractive distillation. In order to obtain the same degree of purity, there must be used in the liquid-liquid extraction, extractors provided with rotating or pulsating devices. This type of extractor is, however, very expensive to purchase and maintain, utilizes more power and is furthermore in operation associated with a relatively large amount of serious operating failures.

It has already been proposed to use in the recovery of aromatic substances a combination of the liquid-liquid and extractive distillation procedures. With such a combination, it is possible to carry out the liquid-liquid extraction with a reduced amount of solvent which amount is not adequate to extract the total of the aromatic substances from the starting hydrocarbon mixture. However, the low boiling aromatic substances are in their entirety taken up. The resulting raffinate phase of the liquid-liquid extraction is then subjected to an extractive distillation using the same solvent. The sump product of the extractive distillation can then be combined with the aromatic fraction extracted in the liquid-liquid extraction and the combination then subjected to a distillation for driving off the solvent. This type of procedure has the major disadvantage that in the after arranged extractive distillation, again a very high amount of non-aromatic substances must be taken off at the head.

Another possibility for combining a liquid-liquid extraction and an extractive distillation which has been proposed consists in a first stage extraction being carried out for separating off a substantially completely aromatic-free raffinate from the hydrocarbon mixture being processed while the extract contains the total of the aromatic substances and a part of the non-aromatic substances present in the starting hydrocarbon mixture. This extract is then subjected to a further separation treatment in a subsequently arranged extractive distillation with the same solvent. The sump product of the extractive distillation contains in addition to the solvent the major amount of the aromatic substances present in the starting hydrocarbon mixture whereas the head product is composed of non-aromatic substances and a minor amount of the aromatic substances and is reintroduced into the pre-arranged liquid-liquid extraction.

The last-described procedure, in principle, provides an acceptable method whereby the earlier-mentioned difficulties can be avoided in that for the isolation there are used both a liquid-liquid extraction and an extractive distillation.

Notwithstanding that a number of disadvantages are avoided, this last procedure has not proved entirely satisfactory. This is in the main attributable to the fact that up until now no selective solvent has been found that is equally suitable for use in both the liquid-liquid extraction and also for the extractive distillation. It has been necessary therefore in carrying out this latter combined procedure to conduct the liquid-liquid extraction using multi-stage extactors provided with rotating or pulsating devices. Because of the limited choice of solvent, it has not been possible prior to the instant aromatic-free raffinates from the liquid-liquid separation.

It is an object of this invention to provide an improved process for recovering highly pure aromatic substances from hydrocarbon mixtures containing the same as well as non-aromatic substances.

It is another object of this invention to provide an improved process for recovering highly pure aromatic substances from hydrocarbon mixtures containing the same as well as non-aromatic substances which can be carried out in an inexpensive easily maintained and operated plant.

It is a further object of the invention to provide such a process avoiding the disadvantages of the art related to the limited choice of solvents.

Still another object of the invention is to provide a new selective solvent having improved properties which can be suitably used for both the liquid-liquid extraction and also for the subsequently carried out extractive distillation.

These and other objects and advantages of the invention will become apparent from a consideration of the following disclosure.

In accordance with the invention, there is provided a process for recovering highly pure aromatic substances from hydrocarbon mixtures which contain, in addition to the aromatic substances, a high content of non-aromatic substances by liquid-liquid extraction advantageously followed by an extractive distillation which is characterized in that as selective solvent there are used mixtures of N-substituted morpholines and N-substituted succinimides in mixing ratios of between 90 wt.-percent N-substituted morpholine and 10 wt.-percent N-substituted succinimide and 30 wt.-percent N-substituted morpholine and 70 wt.-percent N-substituted succinimide.

The mixture of 70 wt.-percent N-formylmorpholine and 30 wt.-percent N-hydroxyethylsuccinimide is characterized by particularly favorable properties. While this mixture has been indicated as constituting a preferred mixture, this is not to be construed as in any way eliminating the use of mixtures in which both components are present in a different ratio. Illustrative examples of other particularly suitable solvent compositions are the following:

| | Wt.-percent |
|---|---|
| N-formyl morpholine | 80 |
| N-hydroxyethyl succinimide | 20 |
| N-formyl morphine | 60 |
| N-hydroxypropyl succinimide | 40 |
| N-hydroxyethyl morpholine | 60 |
| N-hydroxyethyl succinimide | 40 |
| N-acetyl morpholine | 50 |
| N-hydroxypropyl succinimide | 50 |

In accordance with the process of the invention, in a first stage the mixture of hydrocarbons to be worked up is subjected to a liquid-liquid extraction whereby a substantially completely aromatic-free raffinate is separated off, while the extract contains the total aromatic substances and a portion of the non-aromatic substances contained in the starting hydrocarbon mixture. This extract from the liquid-liquid extraction is then subjected in an after arranged extractive distillation to a further separation using therefor the same solvent. The sump product recovered from the extractive distillation contains in addition to the solvent, the major portion of the aromatic substances present in the starting hydrocarbon mixture and can be further separated into solvent and aromatic substances by distillation. The solvent, after the separation of the aromatic substances therefrom can be recycled into the process. Simultaneously, the head product of the extractive distillation which is composed of non-aromatic substances and a small or minor amount of aromatic substances is conducted into the bottom part of the extractor arranged after the liquid-liquid extraction. This extractor can in accordance with the invention be a simple sieve bottom column provided with stationary plates or trays. The previously necessary rotating or pulsating devices incorporated into the extractor become superfluous in accordance with the invention as a result of the herein proposed solvent mixtures.

The foregoing does not of course eliminate the fact that the solvent mixtures of the invention can also be successfully used when only a liquid-liquid extraction is carried out. This is particularly the case where the degree of purity of the recovered aromatic substances does not have to be too high. The extractive distillation can also be successfully carried out without an additional reflux condenser. If the hydrocarbons to be separated in part have very low boiling temperatures, the process of the invention can be carried out not under normal pressure, as is conventional, but at elevated pressures. In certain cases, the process can be carried out advantageously under vacuum. In the use of vacuum an advantage is realized that the sump temperature of the extractive distillation can be reduced. This is particularly desirable when the hydrocarbon mixture to be separated contains substances which tend to undergo polymerization, such as for example the olefins. Finally, the after-arranged extractive distillation can be carried out in an unforeseeably simple manner in that in accordance with the invention, a separate solvent addition to the extractive distillation column is not necessary. The column in this case is moreover constructed as a simple stripping column and in this column the extract from the prearranged liquid-liquid extraction which contains in addition to the aromatic and non-aromatic substances also solvent can under the conditions undergo an extractive distillation.

The superiority of the solvent mixtures used in accordance with the invention has been established experimentally and can be clearly seen from the comparison of the data thereby obtained. In the data hereinafter set out, the extraction coefficients and yield values obtained with a solvent mixture of 70 wt.-percent N-formyl morpholine and 30-wt. percent N-hydroxyethyl succinimide are compared with the corresponding values obtained under identical conditions but using sulfolane as the solvent. The results of the comparative experiments are set out in Table 1 which follows:

TABLE I

| Solvent | Extraction coefficient | | | Yield in the solvent in wt.-percent of recovery | | |
|---|---|---|---|---|---|---|
| | n-C₇-HC[1] benzene | n-C₈HC toluene | n-C₉HC o-xylene | Benzene | Toluene | Xylene |
| Sulfolane | 52.7 | 51.1 | 63.9 | 91.2 | 86.8 | 83.8 |
| 70 weight-percent N-formyl morpholine plus, 30 weight-percent, N-hydroxyethyl succinimide | 54.8 | 61.8 | 97.4 | 90.0 | 85.6 | 82.8 |

[1] HC designates hydrocarbon.

From the numerical data, it can be seen that the solvent in accordance with the invention based on the values for extraction coefficients shows for the system n-$C_7$ hydrocarbons/benzene, values slightly inferior to that obtained for the systems n-$C_8$ hydrocarbons/toluene and n-$C_9$ hydrocarbons/o-xylene but is clearly superior to the sulfolane. From this it follows that the solvent in accordance with the invention is most advantageous when the aromatics benzene, toluene and xylene are to be recovered simultaneously.

The process of the invention is further illustrated and described in the following example in conjunction with a drawing showing schematically the process of the invention.

EXAMPLE

The starting hydrocarbon mixture had the following composition:

|  | Wt.-percent |
|---|---|
| Lower hydrocarbons inclusive of iso $C_7$ hydrocarbons | 48.0 |
| n-$C_7$ hydrocarbons | 6.8 |
| Benzene | 6.9 |
| Iso-$C_8$ hydrocarbons | 12.9 |
| n-$C_8$ hydrocarbons | 1.6 |
| Toluene | 23.0 |
| Iso-$C_9$ hydrocarbons | 0.3 |

This starting mixture was introduced into extractor 2 via conduit 1. Extractor 2 was constructed as a standard sieve bottom column provided with stationary plates. The liquid-liquid extraction was carried out in extractor 2 at a temperature of 90° C. and a pressure of 2 atm. The amount of starting hydrocarbon mixture introduced through conduit 1 amounted to 30.8 kg./hr. As selective solvent, a mixture of 70 wt.-percent N-formyl morpholine and 30 wt.-percent N-hydroxyethyl succinimide was used. The solvent was introduced into the extractor 2 through conduit 11 in an amount of 97.0 kg./hr. The non-aromatic substances were drawn off from the top of extractor 2 via the line 3. The non-aromatic substance taken off in this manner amounted to 19.5 kg./hr. The total aromatic substances and a part of the non-aromatic substances were taken off from the extractor 2 as an extract via line 4 and introduced into the middle part of the extractive distillation column 5. The same solvent was used as was used in extractor 2 and was introduced into column 5 via conduit 12. The solvent was used in this case in an amount of 10.0 kg./hr. The extractive distillation was carried out at a pressure of 1.2 atm. and a sump temperature in the range of 210–215° C. The head product of the extractive distillation was recycled via conduit 6 into the bottom part of the extractor 2 in an amount of 3.3 kg./hr. The sump product of the extractive distillation which contains the major part of the aromatic substances and the solvent was conducted via line 7 into distillation column 8 where the separation of aromatic substances from solvent was carried out. The amount of sump product introduced into the distillation column amounted to 116.0 kg./hr. The aromatic fraction was taken off from the head of column 8 via line 9 and could be separated into a benzene and a toluene fraction in a further column not shown in the drawing. The amount of the aromatic fraction taken off via line 9 amounted to 9.1 kg./hr. The solvent freed of aromatic substances was taken off from the sump of distillation column 8 via conduit 10 and redelivered via conduits 11 and 12 to the prearranged extraction column 5. Line 13 served for introducing fresh solvent into the system.

In the following Table 2, the composition of the separated products of the process are set out. The reference numerals used in the table refer to the reference numerals of the drawing.

TABLE 2

| | All values in weight-percent | | |
|---|---|---|---|
| | Non-aromatics in line 3 | Reflux in line 6 | Aromatics in line 9 |
| Lower hydrocarbons up to and including iso-$C_7$ hydrocarbons | 69 | 51 | |
| n-$C_7$ hydrocarbons | 10.0 | 7.1 | |
| Benzene | 0.052 | 23.2 | 22.8 |
| Iso-$C_8$ hydrocarbons | 16.1 | 10.4 | |
| n-$C_8$ hydrocarbons | 2.1 | 1.2 | 0.0009 |
| Toluene | 0 28 | 6.5 | 77.72 |
| Iso-$C_9$ hydrocarbons | 0.4 | 0.5 | 0.0008 |

From the aromatic fraction (line 9) a benzene fraction of substantially 100% purity and a toluene fraction having a 99.99% purity were isolated. The yield of benzene amounted to 99.6 wt.-percent and the toluene yield to 99.2 wt.-percent.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In the process for recovering highly pure aromatic substances from hydrocarbon mixtures which contain in addition to the aromatic substances high amounts of non-aromatic substances by liquid-liquid extraction advantageously followed by an extractive distillation, the improvement which comprises using as selective solvent a mixture of N-substituted morpholine and N-substituted succinimide in a mixing ratio of between 90 wt.-percent N-substituted morpholine and 10 wt.-percent N-substituted succinimide and 30 wt.-percent N-substituted morpholine and 70 wt.-percent N-substituted succinimide.

2. Process according to claim 1 wherein said selective solvent comprises a mixture of 70 wt.-percent N-formyl morpholine and 30 wt.-percent N-hydroxyethyl succinimide.

3. Process according to claim 1, which comprises first subjecting the hydrocarbon mixture to a liquid-liquid extraction under conditions whereby the extract recovered contains the total aromatic substances and a part of the non-aromatic substances, thereafter subjecting the extract to an extractive distillation using the same solvent for both the liquid-liquid extraction and the extractive distillation, recovering the sump product from the extractive distillation, subjecting said sump product to a distillative separation into aromatic substances and solvent, recovering the head product from the extractive distillation which contains the non-aromatic substances and a part of the aromatic substances and introducing the head product into the liquid-liquid extraction.

4. Process according to claim 1, wherein said extractive distillation is carried out without external reflux.

5. Process according to claim 1, wherein said liquid-liquid extraction is carried out in a sieve bottom column provided with stationary trays.

6. Process according to claim 1, wherein said process is carried out under normal pressure.

7. Process according to claim 1, wherein said process is carried out under elevated pressure.

8. Process according to claim 1, wherein said process is carried out under reduced pressure.

9. Process according to claim 1 wherein said solvent is 80 wt.-percent N-formyl morpholine and 20 wt.-percent N-hydroxyethyl succinimide.

10. Process according to claim 1, wherein said solvent is 60 wt.-percent N-formyl morpholine and 40 wt.-percent N-hydroxypropyl succinimide.

11. Process according to claim 1, wherein said solvent is 60 wt.-percent N-hydroxyethyl morpholine and 40 wt.-percent N-hydroxyethyl succinimide.

12. Process according to claim 1, wherein said solvent is 50 wt.-percent N-acetyl morpholine and 50 wt.-percent N-hydroxypropyl succinimide.

References Cited

UNITED STATES PATENTS

| | | | |
|---|---|---|---|
| 2,357,667 | 9/1944 | Kuhn | 208—326 |
| 3,325,399 | 6/1967 | Cinelli et al. | 208—323 |
| 3,434,936 | 3/1969 | Luther et al. | 260—674 SE |
| 3,617,535 | 11/1971 | Weitz | 208—323 |

HERBERT LEVINE, Primary Examiner

U.S. Cl. X.R.

208—313, 326; 260—674 SE